United States Patent
Kageyama et al.

(10) Patent No.: US 11,992,913 B2
(45) Date of Patent: May 28, 2024

(54) WORKPIECE SUPPORT DEVICE, UNLOADING DEVICE, LOADING DEVICE, AND WORKPIECE MACHINING APPARATUS

(71) Applicant: Yamazaki Mazak Corporation, Niwa-gun (JP)

(72) Inventors: Keisuke Kageyama, Niwa-gun (JP); Kazuya Shimamoto, Niwa-gun (JP); Keita Hachiya, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 233 days.

(21) Appl. No.: 17/551,044

(22) Filed: Dec. 14, 2021

(65) Prior Publication Data

US 2022/0105597 A1 Apr. 7, 2022

Related U.S. Application Data

(63) Continuation of application No. PCT/JP2019/025248, filed on Jun. 25, 2019.

(51) Int. Cl.
*B23Q 7/05* (2006.01)
*B23D 33/02* (2006.01)
*B23K 26/70* (2014.01)

(52) U.S. Cl.
CPC ............... *B23Q 7/05* (2013.01); *B23D 33/02* (2013.01); *B23K 26/70* (2015.10)

(58) Field of Classification Search
CPC ........... B23Q 7/05; B23K 26/70; B23D 33/02
(Continued)

(56) References Cited

U.S. PATENT DOCUMENTS 3,655,067 A * 4/1972 White ................. B24B 5/38
414/800
4,934,047 A * 6/1990 Maruyama ............. B23P 19/04
29/793
(Continued)

FOREIGN PATENT DOCUMENTS

CN 101027152 8/2007
CN 101259918 9/2008
(Continued)

OTHER PUBLICATIONS

Supplementary European Search Report for corresponding EP Application No. 19934621.4-1016, dated Feb. 10, 2022.
(Continued)

*Primary Examiner* — Gene O Crawford
*Assistant Examiner* — Lester Rushin, III
(74) *Attorney, Agent, or Firm* — MORI & WARD, LLP

(57) ABSTRACT

A workpiece support device includes a shaft rotatable about a shaft rotation axis of the shaft, a first support, a first reciprocating mechanism, and a first connecting rod having one end and another end. The shaft extends along a longitudinal direction of a workpiece. The first support includes a first support roller that is rotatable about a first roller rotation axis orthogonal to the shaft rotation axis and that is configured to contact the workpiece to support the workpiece. The first reciprocating mechanism has one end connected to the first support and is configured to reciprocate in a first expansion-contraction axis direction. The one end of the first connecting rod is rotatably connected to the first support. The another end of the first connecting rod is connected to the shaft such that the another end of the first connecting rod is rotatable together with the shaft.

20 Claims, 7 Drawing Sheets

(58) Field of Classification Search
USPC .................................................. 198/468.9
See application file for complete search history.

(56) References Cited

U.S. PATENT DOCUMENTS

| | | | | |
|---|---|---|---|---|
| 5,769,597 A | * | 6/1998 | Tsune | ................ B65G 47/8838 |
| | | | | 414/746.1 |
| 2007/0245540 A1 | | 10/2007 | Ishii et al. | |
| 2008/0219825 A1 | | 9/2008 | Yoshida et al. | |
| 2009/0007735 A1 | | 1/2009 | Mall | |
| 2010/0264121 A1 | | 10/2010 | Dilger et al. | |
| 2022/0105597 A1 | * | 4/2022 | Kageyama | ............... B23Q 7/05 |

FOREIGN PATENT DOCUMENTS

| | | | |
|---|---|---|---|
| CN | 101337329 | | 1/2009 |
| CN | 101754827 | | 6/2010 |
| CN | 105538025 A | * | 5/2016 |
| CN | 206484304 U | | 9/2017 |
| CN | 108339898 | | 7/2018 |
| CN | 207788019 U | | 8/2018 |
| CN | 109570897 | | 4/2019 |
| FR | 1579775 | | 8/1969 |
| JP | 52-088969 | | 7/1977 |
| JP | 52-093985 U | | 7/1977 |
| JP | 60-223692 | | 11/1985 |
| JP | 05-037428 U | | 5/1993 |
| JP | 08-001248 | | 1/1996 |
| JP | 08-187596 | | 7/1996 |
| JP | 2002-066987 | | 3/2002 |
| JP | 2010-179449 | | 8/2010 |
| KR | 20140111220 | * | 9/2014 |

OTHER PUBLICATIONS

Chinese Office Action for corresponding CN Application No. 201980080156.6, dated Sep. 1, 2022.
Translation of Written Opinion for corresponding International Application No. PCT/JP2019/025248, dated Aug. 20, 2019.
International Search Report for corresponding International Application No. PCT/JP2019/025248, dated Aug. 20, 2019.
Written Opinion for corresponding International Application No. PCT/JP2019/025248, dated Aug. 20, 2019.
Japanese Office Action for corresponding JP Application No. 2019-571766, dated Apr. 7, 2020 (w/ English machine translation).

* cited by examiner

WORKPIECE SUPPORT DEVICE, UNLOADING DEVICE, LOADING DEVICE, AND WORKPIECE MACHINING APPARATUS

CROSS-REFERENCE TO RELATED APPLICATIONS

The present application is a continuation application of International Application No. PCT/JP2019/025248, filed Jun. 25, 2019. The contents of this application are incorporated herein by reference in their entirety.

BACKGROUND OF THE INVENTION

Field of the Invention

The present invention relates to a workpiece support device, an unloading device, a loading device, and a long-workpiece machining apparatus.

Discussion of the Background

As apparatuses that perform non-contact thermal machining by applying thermal energy to a workpiece such as a metal plate, such machining apparatuses are known that uses laser, plasma, or an electron beam. When these machining apparatuses are such machining apparatuses that perform machining of cutting or partially removing a long workpiece having, for example, a bar shape or a pipe shape, some of the machining apparatuses are provided with: a loading mechanism that conveys a long workpiece into a machining region of the machining apparatus; and an unloading mechanism that takes out a thermally machined workpiece. In this respect, the loading mechanism and the unloading mechanism are required to convey and support the long workpiece Without damage to the long workpiece and accurately.

As an example of such machining apparatus, a laser machining apparatus is disclosed in JP 2010-179449A. The laser machining apparatus includes a workpiece support device including: a first support member, a second support member, and a third support member each having a contact portion that is to contact a workpiece to support and that has a line shape or a strip shape approximately parallel with a direction orthogonal to the axial direction of the workpiece; height adjusting means for adjusting the heights of the above members; and position adjusting means for adjusting the positions of the above members relative to each other. The contact portions of the first support member and the second support member are arranged to form an approximately V shape with the workpiece held in the V shape. The contact portion of the third support member is held between and crosses the contact portions of the first support member and the second support member.

The laser machining apparatus disclosed in JP 2010-179449A can be used regardless of whether the conveyed long workpiece is a round pipe or a square pipe, and even though long workpieces vary in outer diameter, the laser machining apparatus is capable of supporting the long workpiece at three points.

SUMMARY OF THE INVENTION

According to a first aspect of the present disclosure, a workpiece support device includes a shaft rotatable about a shaft rotation axis of the shaft, a first support, a first reciprocating mechanism, and a first connecting rod having one end and another end. The shaft extends along a longitudinal direction of a workpiece. The first support includes a first support roller that is rotatable about a first roller rotation axis orthogonal to the shaft rotation axis and that is configured to contact the workpiece to support the workpiece. The first reciprocating mechanism has one end connected to the first support and is configured to reciprocate in a first expansion-contraction axis direction. The one end of the first connecting rod is rotatably connected to the first support. The another end of the first connecting rod is connected to the shaft such that the another end of the first connecting rod is rotatable together with the shaft.

According to a second aspect of the present disclosure, an unloading device includes a plurality of the workpiece support devices described above. A rotational direction of the shaft of each of the plurality of the workpiece support devices is same.

According to a third aspect of the present disclosure, a loading device includes a plurality of the workpiece support devices described above. A rotational direction of the shaft of each of the plurality of the workpiece support devices is same.

According to a fourth aspect of the present disclosure, a workpiece machining apparatus includes a machining mechanism configured to machine a workpiece in a non-contact manner, and the above described unloading device.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
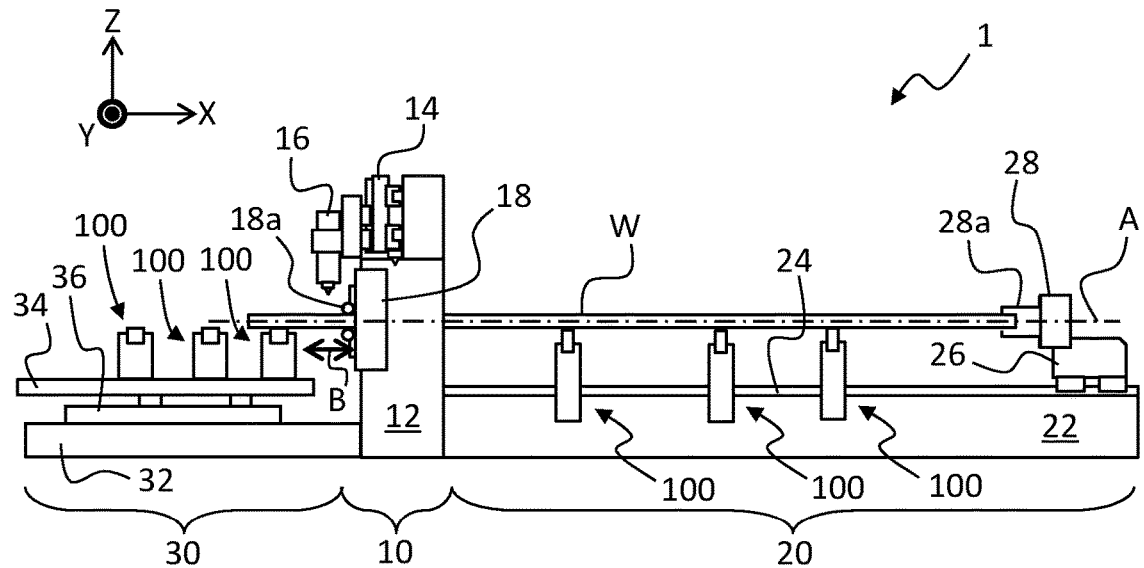
FIG. 1 is a side view of a long-workpiece machining apparatus to which a representative example of a workpiece support device according to the present invention is applied, illustrating an outline of the long-workpiece machining apparatus.

The embodiments will now be described with reference to the accompanying drawings, wherein like reference numerals designate corresponding or identical elements throughout the various drawings.

When a long workpiece is machined, the long workpiece is conveyed to a machining region of a machining apparatus. Generally, a loading mechanism is provided with a first chuck to hold one end of the long workpiece during the conveyance, and the machining apparatus is provided with a second chuck to hold the long workpiece immediately before the machining region during the conveyance. The second chuck has such a structure that includes a device such as a roller to hold a side surface of the long workpiece so that the long workpiece can be conveyed in its longitudinal direction while being held by the roller.

When a long workpiece is machined using the above-described configuration, the long workpiece is delivered to the machining region, and the delivered-side end of the long workpiece becomes a beam-shaped free end. The free end causes the long workpiece to vibrate at the delivery time and/or the rotation time. In order to overcome this problem, such a method has been employed that a support device is provided to support a side portion (side surface) of the delivered-side the long workpiece W, thereby preventing the long workpiece W from vibrating.

However, this method involves a time-consuming process of manually adjusting the position and/or angle of the support member of the support device disclosed in, for example, JP 2010-179449A. Also with this method, it is difficult to secure accuracy of the position or angle. Further, the position or angle is fixed using a connection member such as a bolt. This makes the support device less rigid as a whole.

In light of the considerations above, the workpiece support device according to each embodiment of the present invention has such a structure that a rotation of the shaft member is conveyed to the reciprocating mechanism via a connecting rod so as to move a support member mounted on the reciprocating mechanism. This structure ensures that the position and/or angle of the support member can be easily adjusted merely by controlling the rotational angle of the shaft member. Also in this structure, no connection member is used for positioning, ensuring that the device as a whole is provided with a substantial level of rigidity. It is to be noted that the following description contains facts that have been conceived of by the inventors, and that these facts are provided for reference purposes, that is, to further the understanding of the workpiece support device according to each embodiment. Therefore, it should be noted that these facts are not known in the art.

Embodiment 1

FIG. 1 is a side view of a long-workpiece machining apparatus to which a representative example of the workpiece support device according to the present invention is applied, illustrating an outline of the long-workpiece machining apparatus. As illustrated in FIG. 1, a long-workpiece machining apparatus 1 includes: a machining apparatus 10, which thermally machines a long workpiece (a workpiece) W; a loading device 20, which forwards the long workpiece W to the machining apparatus 10; and an unloading mechanism 30, which discharges the long workpiece W that has been processed.

The machining apparatus 10 includes: a machining head 16; a machining base 12, which includes a machining region B; a movement mechanism 14, which is mounted on the machining base 12 and moves the machining head 16 in the YZ direction; and a holding mechanism 18, which holds the long workpiece W immediately before the machining region B using a clamp 18a and rotatably about longitudinal axis A. The machining head 16 performs non-contact thermal machining with respect to the long workpiece W by, for example, applying thermal energy to the long workpiece W. Examples of the machining head 16 include a laser machining head, a plasma machining head, and an electron beam machining head.

The machining apparatus 10 receives the long workpiece W sent from a loading mechanism 20, described later. Then, the clamp 18a of the holding mechanism 18 holds the long workpiece W at an appropriate position. With the long workpiece W in this state, the machining head 16 radiates thermal energy to the machining region B to machine the long workpiece W. In this respect, a machining origin point (reference point) is set in the YZ surface in the machining region B; specifically, the machining origin point is set at the intersection of the YZ surface and the longitudinal axis A. Then, part of the long workpiece W that has been machined is sent to the unloading mechanism 30, which is next to the machining apparatus 10.

The unloading mechanism 30 includes: an unloading base 32; a table 34, which includes at least one unloading-side the workpiece support device 100 on the upper surface; and an elevating mechanism 36, which moves the table 34 up and down. The unloading mechanism 30 has a function of receiving the long workpiece W that has been machined at the machining apparatus 10 and taking out the long workpiece W to outside the long-workpiece machining apparatus 1. Further, the long workpiece W turns into such a state that its side surface (lower surface) is supported by the at least one workpiece support device 100. This prevents the long workpiece W from vibrating at the forwarding time and/or the rotation time. In this respect, the longitudinal axis A of the long workpiece W supported by the workpiece support device 100 is supported at a predetermined height (see reference character HC in FIGS. 6A to 6C) irrespective of the outer diameter of the long workpiece W (or the diameter of the circumscribed circle of the long workpiece W).

The loading mechanism 20 includes: a loading base 22; a guide rail 24, which extends toward the machining apparatus 10 on the loading base 22; a motion mechanism 26, which is movable on the guide rail 24; a chuck mechanism 28, which is mounted on the motion mechanism 26 on the side of the machining apparatus 10; and at least one loading-side the workpiece support device 100, which is provided at the chuck mechanism 28 on the side of the machining apparatus 10 and along the guide rail 24. The chuck mechanism 28 includes a chuck 28a, which holds one end of the long workpiece W. With this configuration, the chuck mechanism 28 has a function of rotating the chuck 28a about the longitudinal axis A, which is parallel to the conveyance direction of the long workpiece W.

The loading mechanism 20 forwards the long workpiece W to the machining apparatus 10. Specifically, with the chuck mechanism 28 holding one end of the long workpiece W, the motion mechanism 26 moves along the guide rail 24, that is, in the X direction. In this respect, the long workpiece W turns into such a state that its side surface (lower surface) is supported by the at least one workpiece support device 100 provided along the guide rail 24. This prevents the long workpiece W from vibrating at the forwarding time and/or the rotation time. In this respect, the long workpiece W is supported such that the longitudinal axis A of the long workpiece W supported by the workpiece support device 100 coincides with the center of rotation (not illustrated) of the chuck 28a.

Figure 2:
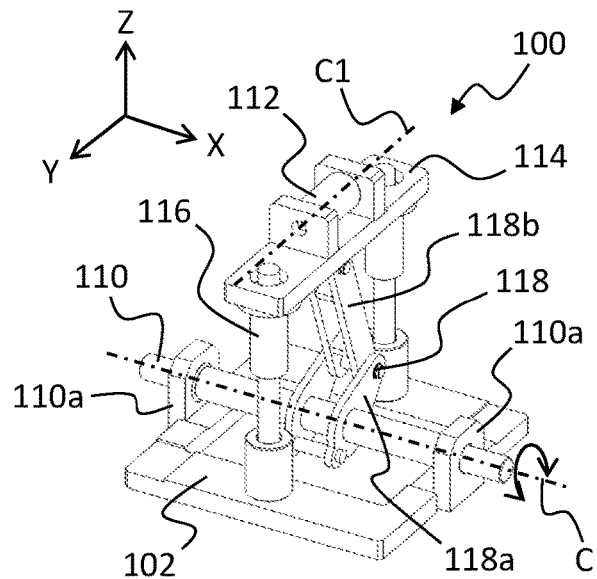
FIG. 2 is a perspective view of a workpiece support device according to embodiment 1, illustrating an outline of the workpiece support device.

Next, by referring to FIGS. 2 and 3, the workpiece support device according to embodiment 1 will be outlined. A workpiece support device 100 according to embodiment 1 has a configuration that supports the long workpiece W at a lower portion of the long workpiece W. It is to be noted that in the following embodiment, description will be made with regard to the workpiece support device provided at the unloading mechanism, and no description will be made with regard to the workpiece support device provided at the loading mechanism, which is similar in configuration to the unloading mechanism.

FIG. 2 is a perspective view of a workpiece support device according to embodiment 1, illustrating an outline of the workpiece support device. As illustrated in FIG. 2, the workpiece support device 100 according to embodiment 1 includes: a support base 102; a shaft member (a shaft) 110, which is mounted on the support base 102 along the longitudinal axis A of the long workpiece W (the X direction illustrated in FIG. 2); a support roller (a first support roller) 112, which is rotatable about a roller rotation axis (a first roller rotation axis) C1, which extends in the Y direction and is provided in an orthogonal surface (in the YZ surface) orthogonal to the shaft member 110; a first support member (a first support) 114, which has an upper surface on which the support roller 112 is rotatably mounted; a reciprocating mechanism (first reciprocating mechanism) 116, which has one end mounted on the support member (the support) 114 and another end mounted on the support base 102 and which is reciprocatable in a predetermined expansion-contraction axis direction (Z direction or vertical direction)(a first expansion-contraction axis direction); and a connecting rod (first connecting rod) 118, which has one end mounted on the support member 114 and another end mounted on the shaft member 110 and which is capable of making a coordinated rotation.

The shaft member 110 includes bearings 110a at both ends of the shaft member 110 and is mounted on the upper surface of the support base 102 via the bearings 110a. With this configuration, the shaft member 110 is rotatable about shaft rotation axis C, which extends along the longitudinal axis A of the long workpiece W (which is the direction along the X direction illustrated in FIG. 1). The reciprocating mechanism (first reciprocating mechanism) 116 is made up of a pair of cylinder mechanisms mounted on, for example, both ends of the support member (first support member) 114. With this configuration, the reciprocating mechanism 116 has a function of moving the support roller 112 up and down in position and receiving the load of the long workpiece W received by the support roller 112.

Figure 3A:
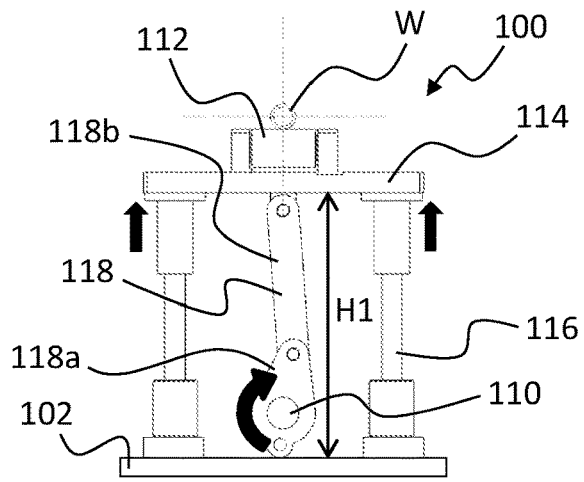
FIG. 3A is a front view of the workpiece support device according to embodiment 1, illustrating an example movement of the workpiece support device.
Figure 3B:
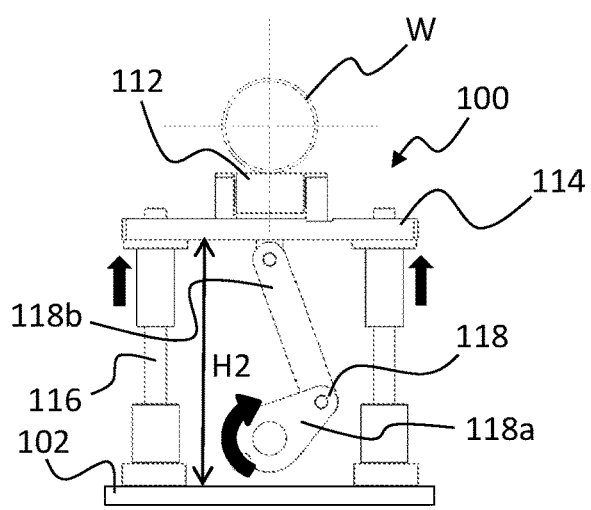
FIG. 3B is a front view of the workpiece support device according to embodiment 1, illustrating an example movement of the workpiece support device.
Figure 3C:
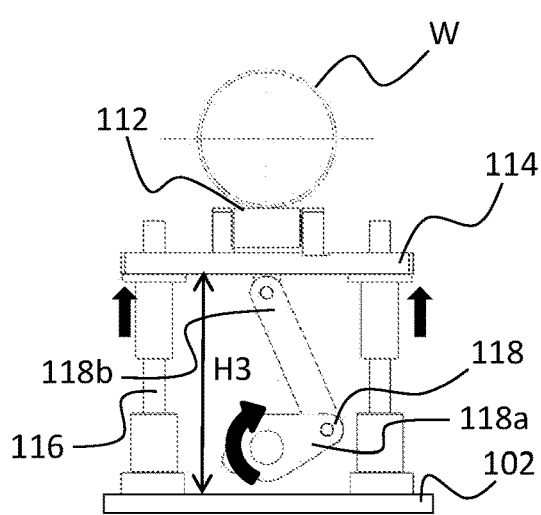
FIG. 3C is a front view of the workpiece support device according to embodiment 1, illustrating an example movement of the workpiece support device.

FIGS. 3A to 3C show front views of the workpiece support device according to embodiment 1, illustrating an example movement of the workpiece support device. As illustrated in FIG. 3A, the connecting rod (first connecting rod) 118 is a link mechanism made up of: a first rod member 118a, which is mounted on the outer circumferential surface of the shaft member 110; and a second rod member 118b, which is mounted on the support member 114.

At one end, the second rod member 118b is rotationally movably mounted on the support member 114, and the first rod member 118a is capable of making a coordinated rotation with the shaft member 110 to change the Z-direction length of the connecting rod 118. With this configuration, the connecting rod 118 is movable in an orthogonal surface (in the YZ surface) orthogonal to the shaft member 110, and is capable of positioning the support member 114 at a height of H1, at which the support roller 112 supports a small-diameter long workpiece W.

Also, as illustrated in FIG. 3B, the position of the support member 114 is changeable to a height of H2 by adjusting the rotational angle of the shaft member 110 to adjust the rotational movement position of the first rod member 118a. Thus, a setting change can be made so that a long workpiece W larger in diameter than the long workpiece W illustrated in FIG. 3A can be supported.

Further, as illustrated in FIG. 3C, the position of the support member 114 is changeable to a height of H3 by rotating the shaft member 110 to adjust the rotational movement position of the first rod member 118a. Thus, a setting change can be made so that a long workpiece W even larger in diameter than the long workpiece W illustrated in FIG. 3B can be supported.

With this configuration, the workpiece support device 100 according to embodiment 1 of the present invention ensures that a rotation of the shaft member 110 is transmitted to the support member 114 as a linear motion via the reciprocating mechanism 116 and the connecting rod 118. This ensures that the support member 114 is moved in the orthogonal surface orthogonal to the shaft rotation axis C to an approximate position. As a result, the position of the support roller 112 at which it contacts the long workpiece W can be adjusted accurately while saving the labor of fixing the support roller 112 manually. Also, at the time when the long workpiece W is conveyed, the support roller 112 makes a rotation while in contact with the side surface of the long workpiece W. This prevents the contact surface of the long workpiece W or the support roller 112 from being worn. It is to be noted that the shaft member 110 may be rotated mechanically using a motor or a similar device or manually using a handle or a similar device.

Embodiment 2

Next, by referring to FIG. 4, the workpiece support device according to embodiment 2 will be outlined. A workpiece support device 200 according to embodiment 2 has such a configuration that supports the long workpiece W at two points of the lower portion of the long workpiece W using two support rollers 222 and 232, which face each other.

Figure 4A:
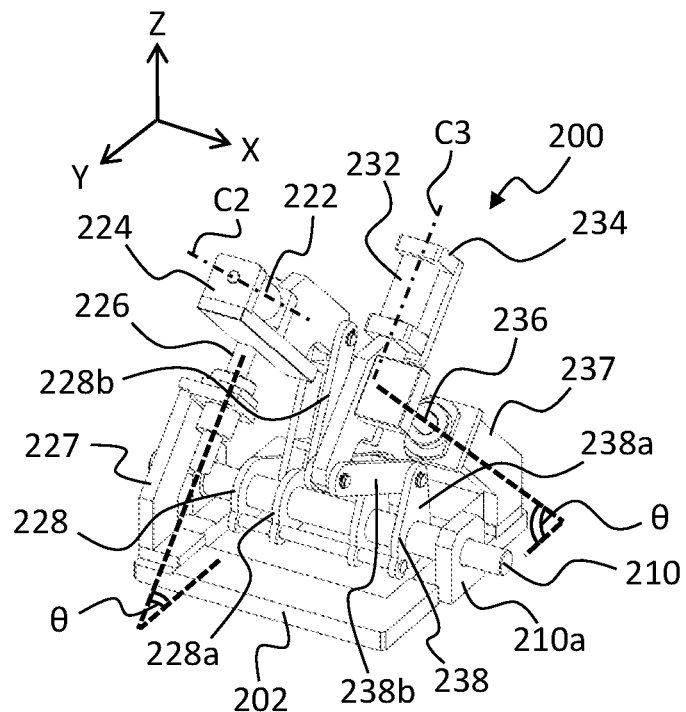
FIG. 4A shows a perspective view of a workpiece support device according to embodiment 2, illustrating an outline of the workpiece support device.
Figure 4B:
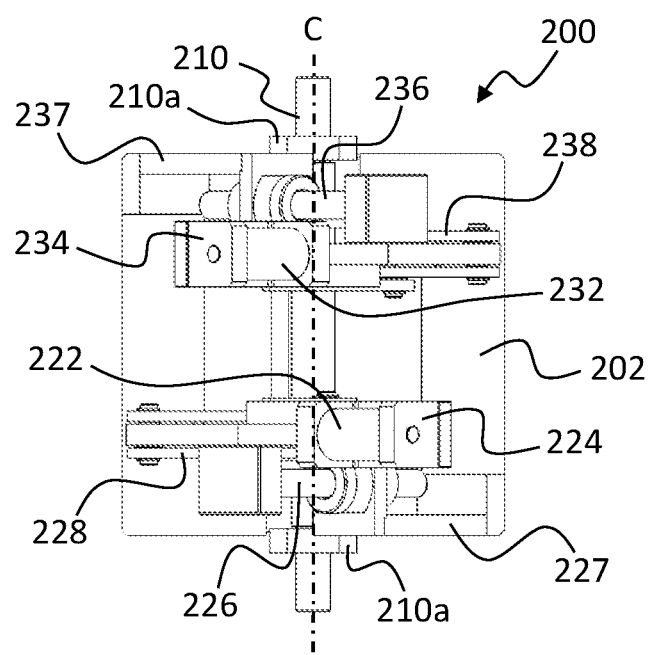
FIG. 4B shows a top view of the workpiece support device according to embodiment 2, illustrating an outline of the workpiece support device.

FIGS. 4A and 4B respectively show a perspective view and a top view of the workpiece support device according to embodiment 2, illustrating an outline of the workpiece support device. As illustrated in FIG. 4A, the workpiece support device 200 according to embodiment 2 is similar to embodiment 1 in that the workpiece support device 200 includes: a support base 202; a shaft member 210, which is along the longitudinal axis A (the X direction) of the support base 202; a support roller 222, which is rotatable about a roller rotation axis C2, which is provided in an orthogonal surface (in the YZ surface) orthogonal to the shaft member 210; a support member (second support member) 224, which has an upper surface on which the support roller 222 is rotatably mounted; a reciprocating mechanism (second reciprocating mechanism) 226, which has one end mounted on the support member 224 and another end mounted on the support base 202 and which is reciprocatable in a predetermined expansion-contraction axis direction (which is a direction orthogonal to the roller rotation axis C2); a connecting rod (second connecting rod) 228, which has one end mounted on the support member 224 and another end mounted on the shaft member 210; a support roller 232, which is opposed to the support roller 222 across a vertical surface passing through the shaft member 210 and which is rotatable about a roller rotation axis C3, which is provided in the YZ surface, which is orthogonal to the shaft member 210; a support member (third support member) 234, which has an upper surface on which the support roller 232 is rotatably mounted; a reciprocating mechanism (third reciprocating mechanism) 236, which has one end mounted on the support member 234 and another end mounted on the support base 202 and which is reciprocatable in a predetermined expansion-contraction axis direction (which is a direction orthogonal to the roller rotation axis C3); and a connecting rod (third connecting rod) 238, which has one end mounted on the support member 234 and another end mounted on the shaft member 210 and which is capable of making a coordinated rotation.

As illustrated in FIG. 4B, the shaft member 210 includes bearings 210a at both ends of the shaft member 210 and is mounted on the upper surface of the support base 202 via the bearings 210a. With this configuration, the shaft member 210 is rotatable about the shaft rotation axis C, which extends along the longitudinal axis A of the long workpiece W (which is the direction along the X direction illustrated in FIG. 1). Also, the reciprocating mechanism (second reciprocating mechanism) 226, an example of which is a cylinder mechanism, is mounted on the support base 202 via a bent member 227, which stands upright on the support base 202, such that the angle between the expansion-contraction axis direction of the reciprocating mechanism 226 and the support base 202 (which is a horizontal surface including the shaft rotation axis C) is θ.

Similarly, the reciprocating mechanism (third reciprocating mechanism) 236, an example of which is a cylinder mechanism, is mounted on the support base 202 via a bent member 237, which stands upright on the support base 202, such that the angle between the expansion-contraction axis direction of the reciprocating mechanism 236 and the support base 202 is θ. Namely, the expansion-contraction axis direction of the reciprocating mechanism 226 and the expansion-contraction axis direction of the reciprocating mechanism 236 are symmetrical with respect to the vertical direction. These configurations ensure that the support members 224 and 234 are arranged such that the angles θ, which are formed with the horizontal surface including the shaft rotation axis C, are equal to each other. For example, each angle θ is set at 45°.

Also, the connecting rod (second connecting rod) 228 is a link mechanism made up of: a first rod member 228a, which is mounted on the outer circumferential surface of the shaft member 210; and a second rod member 228b, which is mounted on the support member 224. Similarly, the connecting rod (third connecting rod) 238 is a link mechanism made up of: a first rod member 238a, which is mounted on the outer circumferential surface of the shaft member 210; and a second rod member 238b, which is mounted on the support member 234. These configurations make the connecting rods 228 and 238 movable in the orthogonal surface (in the YZ surface) orthogonal to the shaft member 110, similarly to the connecting rod 118 illustrated in FIG. 2.

With the above-described configuration, the workpiece support device 200 according to embodiment 2 of the present invention provides the following effects, in addition to the effects obtained by the workpiece support device 100 according to embodiment 1. A rotation of the shaft member 210 is transmitted to the support members 224 and 234 as a linear motion via the reciprocating mechanisms 226 and 236 and the connecting rods 228 and 238. This ensures that the support members 224 and 234 can be adjusted in position simultaneously in the orthogonal surface orthogonal to the shaft rotation axis C. Also, the angles θ, which are formed between and the support base 202 and the reciprocating mechanisms 226 and 236, are set to be equal to each other. This makes the displacement amounts of the two support rollers 222 and 232 identical to each other, making them more easily adjustable and resulting in a shortened adjustment time. Also, the two support rollers 222 and 232 support the long workpiece W at two points while the long workpiece W is being machined by the machining apparatus 10. This stabilizes the support state of the long workpiece W even when the long workpiece W is machined while being rotated about the longitudinal axis A. Further, even when a long workpiece W that is different in outer diameter (or radius of the circumscribed circle) is machined, the two support rollers 222 and 232 approach the side surface of this long workpiece W from outside the long workpiece W. This ensures that the long workpiece W is supported without changing the height position of the longitudinal axis A.

Embodiment 3

Figure 6A:
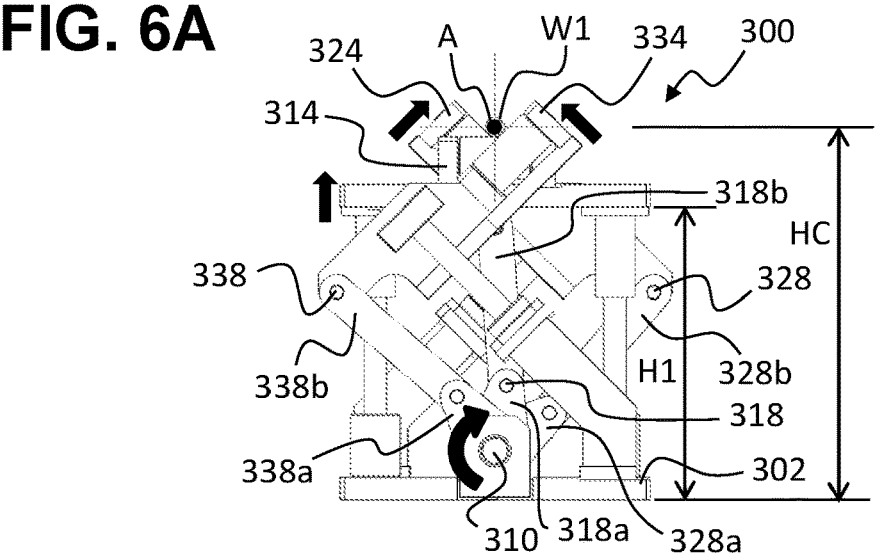
FIG. 6A is a front view of the workpiece support device according to embodiment 3, illustrating an example movement of the workpiece support device.
Figure 6B:
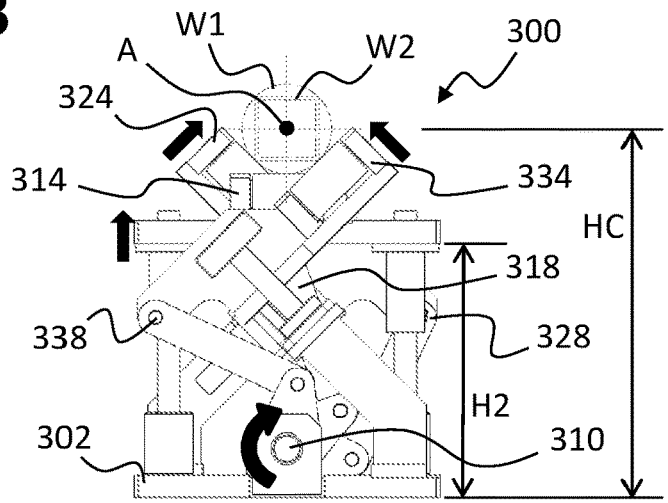
FIG. 6B is a front view of the workpiece support device according to embodiment 3, illustrating an example movement of the workpiece support device.
Figure 6C:
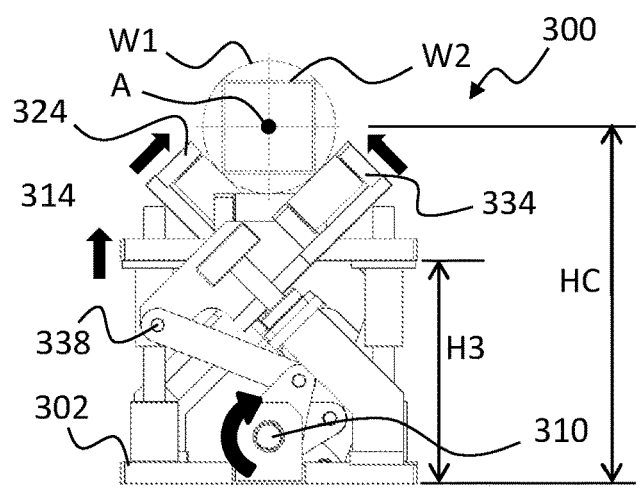
FIG. 6C is a front view of the workpiece support device according to embodiment 3, illustrating an example movement of the workpiece support device.
Figure 7:
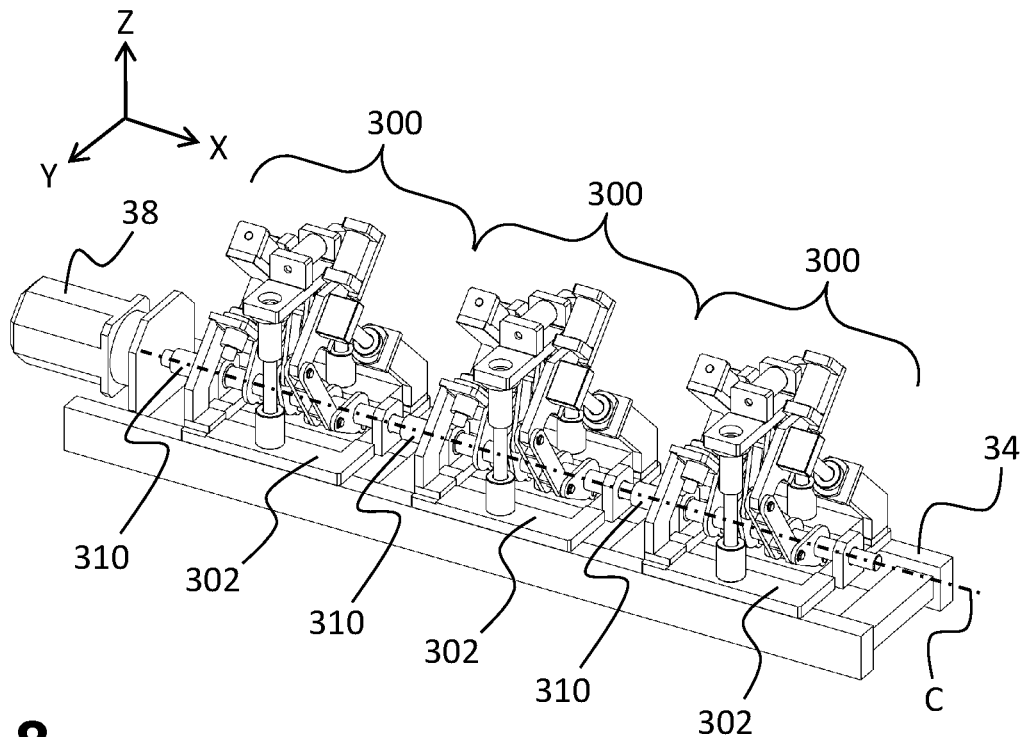
FIG. 7 is a perspective view of an application example in which a plurality of workpiece support devices according to embodiment 3 are aligned in series.

Next, by referring to FIGS. 5 to 7, the workpiece support device according to embodiment 3 will be outlined. The workpiece support device 300 according to embodiment 3 has a configuration that supports the long workpiece W at three points of the lower portion of the long workpiece W using three support rollers 312, 322, and 332. That is, the workpiece support device 300 is a combination of the workpiece support device 100 according to embodiment 1 illustrated in FIG. 2 and the workpiece support device 200 according to embodiment 2 illustrated in FIG. 4.

Figure 5A:
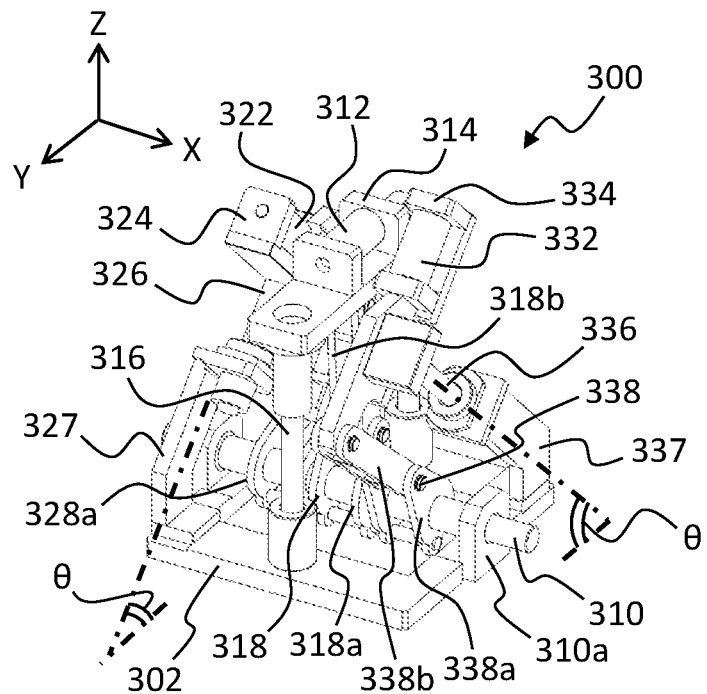
FIG. 5A shows a perspective view of a workpiece support device according to embodiment 3, illustrating an outline of the workpiece support device.
Figure 5B:
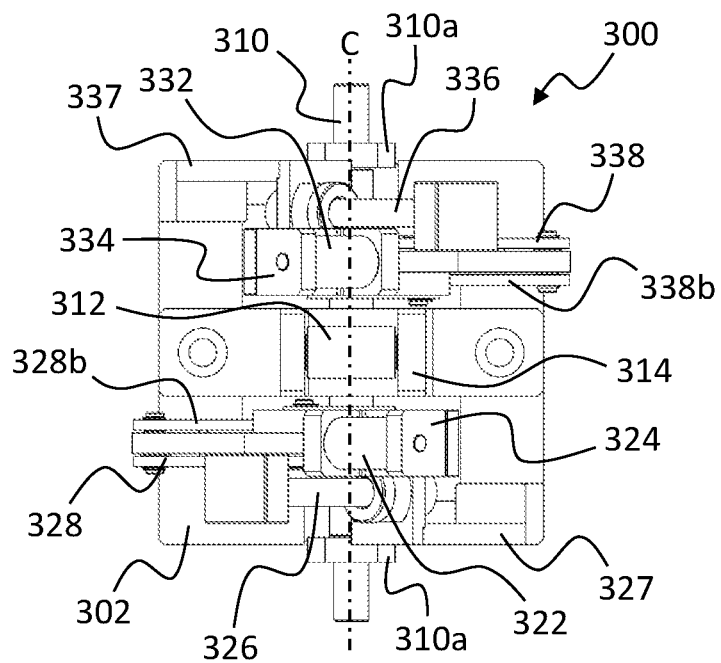
FIG. 5B shows a top view of the workpiece support device according to embodiment 3, illustrating an outline of the workpiece support device.

FIGS. 5A and 5B respectively show a perspective view and a top view of a workpiece support device according to embodiment 3, illustrating an outline of the workpiece support device. As illustrated in FIG. 5A, the workpiece support device 300 according to embodiment 3 includes: a support base 302; a shaft member 310, which is provided along the longitudinal axis A (the X direction) of the support base 302; a support roller 312, which is rotatable about a roller rotation axis (C1 axis) that extends in the Y direction and that is provided in an orthogonal surface (in the YZ surface) orthogonal to the shaft member 310; a support member (first support member) 314, which has an upper surface on which the support roller 312 is rotatably mounted; a reciprocating mechanism (first reciprocating mechanism) 316, which has one end mounted on the support member 314 and another end mounted on the support base 302 and which is reciprocatable in a predetermined expansion-contraction axis direction (Z direction); a connecting rod (first connecting rod) 318, which has one end mounted on the support member 314 and another end mounted on the shaft member 310 and which is capable of making a coordinated rotation; a support roller 322, which is rotatable about the roller rotation axis C2, which is provided in the orthogonal surface (in the YZ surface) orthogonal to the shaft member 310; a support member (second support member) 324, which has an upper surface on which the support roller 322 is rotatably mounted; a reciprocating mechanism (second reciprocating mechanism) 326, which has one end mounted on the support member 224 and another end mounted on the support base 302 and which is reciprocatable in a predetermined expansion-contraction axis direction (which is a direction orthogonal to the roller rotation axis C2); a connecting rod (second connecting rod) 328, which has one end mounted on the support member 324 and another end mounted on the shaft member 310 and which is capable of making a coordinated rotation; a support roller 332, which is opposed to the support roller 322 across a vertical surface passing through the shaft member 310 and which is rotatable about the roller rotation axis C3, which is provided in the orthogonal surface (in the YZ surface) orthogonal to the shaft member 310; a support member (third support member) 334, which has an upper surface on which the support roller 332 is rotatably mounted; a reciprocating mechanism (third reciprocating mechanism) 336, which has one end mounted on the support member 334 and another end mounted on the support base 302 and which is reciprocatable in a predetermined expansion-contraction axis direction (which is a direction orthogonal to the roller rotation axis C3); and a connecting rod (third connecting rod) 338, which has one end mounted on the support member 334 and another end mounted on the shaft member 310 and which is capable of making a coordinated rotation.

As illustrated in FIG. 5B, the shaft member 310 includes bearings 310a at both ends of the shaft member 310 and is mounted on the upper surface of the support base 302 via the bearings 310a. With this configuration, the shaft member 310 is rotatable about the shaft rotation axis C, which extends along the conveyance direction of the long workpiece W (which is the direction along the X direction illustrated in FIG. 1). The reciprocating mechanism (first reciprocating mechanism) 316 is made up of a pair of cylinder mechanisms mounted on, for example, both ends of the support member 314, similarly to embodiment 1. With this configuration, the reciprocating mechanism 316 has a function of moving the support roller 312 up and down in position and receiving the load of the long workpiece W received by the support roller 312.

In contrast, the second reciprocating mechanism 326 and the third reciprocating mechanism 336 each have a configuration of a cylinder mechanism, similarly to embodiment 2; specifically, each mechanism is mounted on the support base 302 via a bent member 327 or 337, which stands upright on the support base 302, such that the angle between the expansion-contraction axis direction of each mechanism and the support base 302 (which is the horizontal surface including the shaft rotation axis C) is θ. These configurations ensure that the support members 324 and 334 are arranged such that the angles θ, which are formed with the horizontal surface including the shaft rotation axis C, are equal to each other. For example, each angle θ is set at 45°.

In each of the first to third connecting rods 318, 328, and 338, a link mechanism is formed by: a first rod member 318a, 328a, or 338a, which is mounted on the outer circumferential surface of the shaft member 310; and a second rod member 318b, 328b, or 338b, which is rotationally movably mounted on the support member 314, 324, or 334. The first rod members 318a, 328a, and 338a each make a coordinated rotation with the shaft member 310 to change the Z-direction length of the connecting rod 318, 328, or 338. This ensures that the connecting rods 318, 328, and 338 are configured to move in the orthogonal surface (in the YZ surface) orthogonal to the shaft member 310, and that the height positions at which the support rollers 312, 322, and 332 contact and support the long workpiece W can be determined.

FIG. 6 shows front views of the workpiece support device according to embodiment 3, illustrating an example movement of the workpiece support device. As illustrated in FIG. 6A, by rotating the shaft member 310, the connecting rod 318 is extended so that the support member 314 is at height position H1. At the same time, the connecting rods 328 and 338 are extended as well, moving in a direction in which the gap between the support members 324 and 334 is diminished. As a result, the support members 314, 324, and 334 are arranged at positions where a smaller-diameter long workpiece W1 can be supported at three points. Then, the long workpiece W1 supported by the workpiece support device 300 is supported such that the longitudinal axis A of the long workpiece W1 is at a height of HC as measured from the bottom surface of the support base 302.

Also, as illustrated in FIG. 6B, by adjusting the rotational angle of the shaft member 310, the rotational movement position of the first rod member 318a is adjusted to change the position of the support member 314 to the height H2 position. At the same time, the rotational movement positions of the first rod members 328a and 338a are adjusted as well, and are determined at positions where the gap between the support members 324 and 334 is slightly wider. As a result, a setting change has been made to the support members 314, 324, and 334 such that the members are arranged at positions where a long workpiece W1 larger in diameter than the long workpiece W1 illustrated in FIG. 6A is supported at three points. Even though long workpieces W1 supported by the workpiece support device 300 vary in outer diameter, any long workpiece W1 is supported such that the longitudinal axis A of the long workpiece W1 is at a constant height of HC as measured from the bottom surface of the support base 302. This also applies when a long workpiece W2 has a circular cross-section.

Further, as illustrated in FIG. 6C, by adjusting the rotational angle of the shaft member 310, the rotational movement position of the first rod member 318a may be adjusted to change the position of the support member 314 to the height H3 position. At the same time, the rotational movement positions of the first rod members 328a and 338a are adjusted, and are determined at positions where the gap between the support members 324 and 334 is further widened. As a result, a setting change has been made to the support members 314, 324, and 334 such that the members are arranged at positions where a long workpiece W1 even larger in diameter than the long workpiece W1 illustrated in FIG. 6B is supported at three points. Then, similarly to the case of FIG. 6B, even though long workpieces W1 supported by the workpiece support device 300 vary in outer diameter, any long workpiece W1 is supported such that the longitudinal axis A of the long workpiece W1 is at a constant height of HC as measured from the bottom surface of the support base 302.

FIG. 7 is a perspective view of an application example in which a plurality of workpiece support devices according to embodiment 3 are aligned in series. As illustrated in FIG. 7, a plurality of workpiece support devices according to the present invention can be aligned in series with their shaft members connected to each other. While FIG. 7 shows an example in which three workpiece support devices 300 according to embodiment 3 are aligned in series, a plurality of workpiece support devices 100 or 200 described in embodiment 1 or embodiment 2 may be aligned in series. It is also possible to combine a plurality of these workpiece support devices.

A plurality of workpiece support devices 300 may be aligned in series by, for example: fixing the plurality of workpiece support devices 300 to the respective support bases 302; and mounting the plurality of workpiece support devices 300 on the upper surface of the table 34, which extends along the longitudinal axis A (the X direction) of the long workpiece W illustrated in FIG. 1, such that the workpiece support devices 300 are arranged in a line and such that the shaft members 310 of the workpiece support devices 300 are connected to each other and extend along a common shaft rotation axis C (that is, the respective shaft rotation axes C are oriented in the same direction). Then, a rotational drive mechanism 38, such as a motor, is connected to the connected shaft members 310 so that the rotational drive mechanism 38 supplies driving force to the shaft members 310. This ensures that a plurality of shaft members 310 can be rotated simultaneously and in the same direction. In this configuration, rotational motions of the rotational drive mechanism 38 can be numerically controlled, facilitating control of the height positions of the support members relative to the plurality of workpiece support devices 300.

In the example illustrated in FIG. 7, the shaft members 310 of the plurality of workpiece support devices 300 are implemented in the form of a common single member, and a single rotational drive mechanism 38 is used to supply driving force to the shaft members 310. Another possible configuration is that rotational drive mechanisms 38 are provided individually to the plurality of the shaft members 310 so that driving force can be supplied independently.

With this configuration, the workpiece support device 300 according to embodiment 3 of the present invention provides the following effects, in addition to the effects obtained by embodiment 1 and embodiment 2. A rotation of the shaft member 310 is transmitted to the support members 314, 324, and 334 as a linear motion via the reciprocating mechanisms 316, 326, and 336 and the connecting rods 318, 328, and 338. This ensures that the displacement amounts of the three support rollers 312, 322, and 332 can be controlled merely by the amount of rotation of the shaft member 310, resulting in a shortened adjustment time. Also, the three support rollers 312, 322, and 332 support the long workpiece W at three points while the long workpiece W is being machined by the machining apparatus 10, ensuring that the long workpiece W is supported in a more stable state. Also, the workpiece support device 300 includes: the support roller 312, which supports the bottom surface of the long workpiece W; and the two support rollers 322 and 332, which are set to form identical angles θ with the support base 302. This ensures that even if a long workpiece W2 has a rectangular cross-section, an L-shaped cross-section, or any other cross-section than a circular cross-section, the long workpiece W2 can be stably supported at any convenient angle as illustrated in FIG. 6.

Embodiment 4

Figure 8:
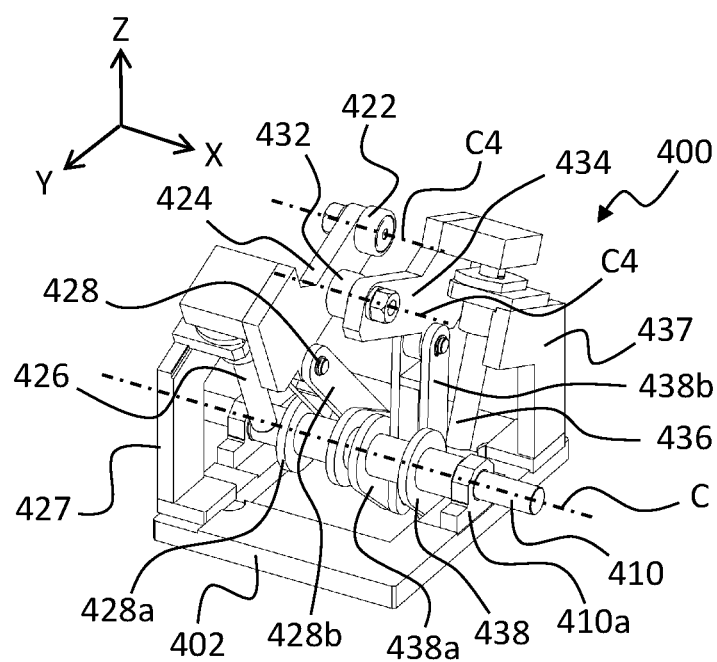
FIG. 8 is a perspective view of a workpiece support device according to embodiment 4, illustrating an outline of the workpiece support device.
Figure 9:
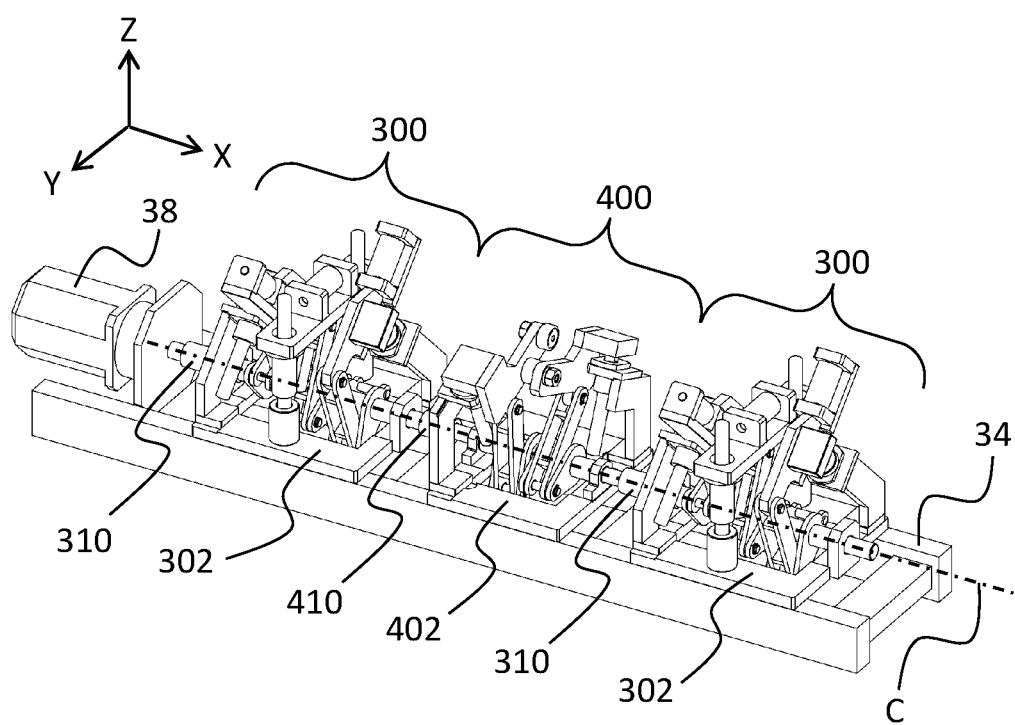
FIG. 9 is a perspective view of an application example of the workpiece support device according to embodiment 4.

Next, by referring to FIGS. 8 and 9, the workpiece support device according to embodiment 4 will be outlined. A workpiece support device 400 according to embodiment 4 has a configuration that supports the long workpiece W at two points of the lower portion of the long workpiece W using two rotationally movable support rollers 422 and 432, which have rotation axes extending along the longitudinal axis A (the X direction) of the long workpiece W.

FIG. 8 is a perspective view of the workpiece support device according to embodiment 4, illustrating an outline of the workpiece support device. As illustrated in FIG. 8, the workpiece support device 400 according to embodiment 4 includes: a support base 402; a shaft member 410, which is provided along the longitudinal axis A (the X direction) of the support base 402; a rotatable support roller 422, which is rotatable about a rotationally movable roller support axis C4, which is parallel to the shaft member 410; a support member (fourth support member) 424, which has a side surface on which the rotatable support roller 422 is rotatably mounted; a reciprocating mechanism (fourth reciprocating mechanism) 426, which has one end mounted on the support member 424 and another end mounted on the support base 402 and which is reciprocatable in a predetermined expansion-contraction axis direction (which is an axial direction provided in the YZ surface, which is orthogonal to the shaft member 410); a connecting rod (fourth connecting rod) 428, which has one end mounted on the support member 424 and another end mounted on the shaft member 410; a support roller 432, which is opposed to the rotatable support roller 422 across a vertical surface passing through the shaft member 410 and which is rotatable about the rotationally movable roller support axis C4; a support member (fifth support member) 434, which has a side surface on which the support roller 432 is rotatably mounted; a reciprocating mechanism (fifth reciprocating mechanism) 436, which has one end mounted on the support member 434 and another end mounted on the support base 402 and which is reciprocatable in a predetermined expansion-contraction axis direction (which is an axial direction provided in the YZ surface, which is orthogonal to the shaft member 410); and a connecting rod (fifth connecting rod) 438, which has one end mounted on the support member 434 and another end mounted on the shaft member 410.

The shaft member 410 includes bearings 410a at both ends of the shaft member 410 and is mounted on the upper surface of the support base 402 via the bearings 410a. With this configuration, the shaft member 410 is rotatable about the shaft rotation axis C, which extends along the longitudinal axis A of the long workpiece W (which is the direction along the X direction illustrated in FIG. 1). Similarly to embodiment 2, the fourth reciprocating mechanism 426 and the fifth reciprocating mechanism 436 each have a configuration of a cylinder mechanism; specifically, each mechanism is mounted on the support base 402 via a bent member 427 or 437, which stands upright on the support base 402, such that the angle between the expansion-contraction axis direction of each mechanism and the support base 402 (which is the horizontal surface including the shaft rotation axis C) is other than θ illustrated in FIG. 4A. These configurations ensure that the support members 424 and 434 are arranged such that the angles formed with the horizontal surface including the shaft rotation axis C are equal to each other. The angles that the support members 424 and 434 form with the support base 402 may be half the angle θ illustrated in FIG. 4A and other drawings, an example being 22.5°.

Similarly to embodiment 2, in each of the fourth connecting rod 428 and the fifth connecting rod 428, a link mechanism is formed by: a first rod member 428a or 438a, which is mounted on the outer circumferential surface of the shaft member 410; and a second rod member 428b or 438b, which is rotationally movably mounted on the support member 424 or 434. Then, the first rod members 428a and 438a each make a coordinated rotation with the shaft member 410 to change the Z-direction length of the connecting rod 428 or 438. This ensures that the height positions at which the rotationally movable support rollers 422 and 432 contact and support the long workpiece W can be determined.

FIG. 9 is a perspective view of an application example of the workpiece support device according to embodiment 4. As illustrated in FIG. 9, a plurality of workpiece support devices 400 according to embodiment 4 may be aligned in series with, for example, the workpiece support device 300 according to embodiment 3 illustrated in FIG. 5 such that the shaft members of the workpiece support devices are connected to each other. Then, the rotational drive mechanism 38, such as a motor, is connected to the connected shaft members 310 and 410 so that the rotational drive mechanism 38 supplies driving force to the shaft members 310 and 410. This ensures that a plurality of shaft members can be rotated simultaneously and in the same direction. While FIG. 9 shows an example in which the workpiece support device 400 is provided between and in series with the two workpiece support devices 300, a plurality of workpiece support devices 100 or 200, instead of the workpiece support devices 300, may be aligned in series. It is also possible to combine a plurality of these workpiece support devices.

With this configuration, the workpiece support device 400 according to embodiment 4 of the present invention includes the two rotationally movable support rollers 422 and 432, which are set to form identical angles θ with the support base 302. This configuration ensures that even though long workpieces W vary in outer diameter, any long workpiece W can be supported at two points at a height different from the height at which the workpiece support device 200 or 300 supports the long workpiece W while maintaining a constant height of the longitudinal axis A from the bottom surface of the support base 402. The above configuration also ensures that even if the long workpiece W is rotationally moved about its longitudinal axis A during conveyance or machining, the long workpiece W can be kept in supported state by the rotationally movable support rollers 422 and 432.

FIG. 1 shows an example in which the workpiece support device 100 according to the present invention is applied to the unloading mechanism 30. Another possible modification is that a configuration identical or common to the unloading mechanism 30 is applied to the loading mechanism 20. Specifically, as illustrated in FIG. 1, the workpiece support devices 100 to 400 illustrated in FIGS. 2 to 9 may be mounted on the loading base 22 of the loading mechanism 20. In this respect, an elevating mechanism (not illustrated) may be provided between the loading base 22 and the workpiece support devices 100 to 400 so that the workpiece support devices 100 to 400 can be lifted upward and downward individually.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Expressions such as "orthogonal", "vertical", "symmetrical", "equal", "horizontal", "parallel" and the like in the present disclosure should not be interpreted strictly and include respectively the meanings of "substantially parallel", "substantially orthogonal", and "substantially identical". Further, representations of other arrangements are not to be strictly interpreted.

As used herein, the phrase "at least one of A and B" is intended to be interpreted as "only A", "only B", or "both A and B".

While representative embodiments and modifications according to the present invention have been described hereinabove, the present invention will not be limited to the embodiments and modifications; it is to be appreciated that various changes may be made by one of ordinary skill in the art. That is, one of ordinary skill in the art would be able to conceive of various alternatives and modifications without departing from the scope of the appended claims.

What is claimed is:

1. A workpiece support device comprising:
   a shaft rotatable about a shaft rotation axis of the shaft and extending along a longitudinal direction of a workpiece;
   a first support comprising a first support roller that is rotatable about a first roller rotation axis orthogonal to the shaft rotation axis and that is configured to contact the workpiece to support the workpiece;
   a first reciprocating mechanism having one end connected to the first support and configured to reciprocate in a first expansion-contraction axis direction; and
   a first connecting rod having one end and another end, the one end of the first connecting rod being rotatably connected to the first support, the another end of the first connecting rod being connected to the shaft such that the another end of the first connecting rod is rotatable together with the shaft.

2. The workpiece support device according to claim 1, wherein the first reciprocating mechanism and the first connecting rod are movable in a surface orthogonal to the shaft rotation axis.

3. The workpiece support device according to claim 1, wherein the first expansion-contraction axis direction is a vertical direction.

4. The workpiece support device according to claim 3, further comprising:
   a second support comprising a second support roller that is rotatable about a second roller rotation axis orthogonal to the shaft rotation axis and that is configured to contact the workpiece to support the workpiece;
   a second reciprocating mechanism having one end connected to the second support and configured to reciprocate in a second expansion-contraction axis direction;
   a second connecting rod having one end and another end, the one end of the second connecting rod being rotatably connected to the second support, the another end of the second connecting rod being connected to the shaft such that the another end of the second connecting rod being rotatable together with the shaft;
a third support comprising a third support roller that is rotatable about a third roller rotation axis orthogonal to the shaft rotation axis and that is configured to contact the workpiece to support the workpiece;
a third reciprocating mechanism having one end connected to the third support and configured to reciprocate in a third expansion-contraction axis direction; and
a third connecting rod having one end and another end, the one end of the third connecting rod being rotatably connected to the third support, the another end of the third connecting rod being connected to the shaft such that the another end of the third connecting rod being rotatable together with the shaft; and
the second expansion-contraction axis direction and the third expansion-contraction axis direction being symmetrical with respect to the vertical direction.

5. The workpiece support device according to claim 4, wherein the first support is provided between the second support and the third support in the shaft rotation axis.

6. The workpiece support device according to claim 1, wherein the shaft is configured to be driven by a rotational drive mechanism.

7. An unloading device comprising:
a plurality of the workpiece support devices according to claim 1, a rotational direction of the shaft of each of the plurality of the workpiece support devices being same.

8. The unloading device according to claim 7, wherein the plurality of the workpiece support devices have a single common shaft as the shaft of each of the plurality of the workpiece support devices.

9. The unloading device according to claim 7, further comprising:
an auxiliary workpiece support device comprising:
a fourth support comprising a fourth support roller that is rotatable about a fourth roller rotation axis parallel to the shaft rotation axis and that is configured to contact the workpiece to support the workpiece;
a fourth reciprocating mechanism having one end connected to the fourth support and configured to reciprocate in a fourth expansion-contraction axis direction;
a fourth connecting rod having one end and another end, the one end of the fourth connecting rod being rotatably connected to the fourth support, the another end of the fourth connecting rod being connected to the shaft such that the another end of the fourth connecting rod being rotatable together with the shaft;
a fifth support comprising a fifth support roller that is rotatable about a fifth roller rotation axis parallel to the shaft rotation axis and that is configured to contact the workpiece to support the workpiece;
a fifth reciprocating mechanism having one end connected to the fifth support and configured to reciprocate in a fifth expansion-contraction axis direction;
a fifth connecting rod having one end and another end, the one end of the fifth connecting rod being rotatably connected to the fifth support, the another end of the fifth connecting rod being connected to the shaft such that the another end of the fifth connecting rod being rotatable together with the shaft;
the fourth expansion-contraction axis direction and the fifth expansion-contraction axis direction being symmetrical with respect to the vertical direction.

10. A loading device comprising:
a plurality of the workpiece support devices according to claim 1, a rotational direction of the shaft of each of the plurality of the workpiece support devices being same.

11. The loading device according to claim 10, wherein the plurality of the workpiece support devices have a single common shaft as the shaft of each of the plurality of the workpiece support devices.

12. The loading device according to claim 10, further comprising:
an auxiliary workpiece support device comprising:
a fourth support comprising a fourth support roller that is rotatable about a fourth roller rotation axis parallel to the shaft rotation axis and that is configured to contact the workpiece to support the workpiece;
a fourth reciprocating mechanism having one end connected to the fourth support and configured to reciprocate in a fourth expansion-contraction axis direction;
a fourth connecting rod having one end and another end, the one end of the fourth connecting rod being rotatably connected to the fourth support, the another end of the fourth connecting rod being connected to the shaft such that the another end of the fourth connecting rod being rotatable together with the shaft;
a fifth support comprising a fifth support roller that is rotatable about a fifth roller rotation axis parallel to the shaft rotation axis and that is configured to contact the workpiece to support the workpiece;
a fifth reciprocating mechanism having one end connected to the fifth support and configured to reciprocate in a fifth expansion-contraction axis direction;
a fifth connecting rod having one end and another end, the one end of the fifth connecting rod being rotatably connected to the fifth support, the another end of the fifth connecting rod being connected to the shaft such that the another end of the fifth connecting rod being rotatable together with the shaft;
the fourth expansion-contraction axis direction and the fifth expansion-contraction axis direction being symmetrical with respect to the vertical direction.

13. A workpiece machining apparatus comprising:
a machining mechanism configured to machine a workpiece in a non-contact manner; and
the unloading device according to claim 7.

14. The workpiece machining apparatus according to claim 13, further comprising:
a loading device comprising:
a plurality of workpiece support devices, each of the workpiece support device comprising:
a shaft rotatable about a shaft rotation axis of the shaft and extending along a longitudinal direction of a workpiece;
a first support comprising a first support roller that is rotatable about a first roller rotation axis orthogonal to the shaft rotation axis and that is configured to contact the workpiece to support the workpiece;
a first reciprocating mechanism having one end connected to the first support and configured to reciprocate in a first expansion-contraction axis direction; and
a first connecting rod having one end and another end, the one end of the first connecting rod being rotatably connected to the first support, the another end of the first connecting rod being connected to the shaft such that the another end of the first connecting rod is rotatable together with the shaft, and a rotational direction of the shaft of each of the plurality of the workpiece support devices being same.

15. The workpiece machining apparatus according to claim 13, wherein the machining mechanism comprises a laser machining mechanism.

16. The workpiece support device according to claim 4, wherein an acute angle between the second expansion-contraction axis direction and a horizontal direction orthogonal to the vertical direction is equal to an another acute angle between the third expansion-contraction axis direction and the horizontal direction.

17. The workpiece support device according to claim 16, wherein the acute angle and the another acute angle are 45 degrees.

18. The unloading device according to claim 9, wherein an acute angle between the fourth expansion-contraction axis direction and a horizontal direction orthogonal to the vertical direction is equal to an another angle between the fifth expansion-contraction axis direction and the horizontal direction.

19. The unloading device according to claim 9, wherein the auxiliary workpiece support device is provided between the plurality of the workpiece support devices in the shaft rotation axis.

20. The workpiece support device according to claim 1, wherein the first connecting rod is a link mechanism including a first rod member connected to the shaft and a second rod member rotatably connected to the first support, the first rod member being rotatably coupled to the second rod member.

* * * * *